(12) United States Patent
Lo et al.

(10) Patent No.: US 11,711,283 B2
(45) Date of Patent: Jul. 25, 2023

(54) CABLE LATENCY MEASUREMENT

(71) Applicant: MELLANOX TECHNOLOGIES TLV LTD., Raanana (IL)

(72) Inventors: Alan Lo, Boulder, CO (US); Matty Kadosh, Hadera (IL); Marian Pritsak, Issaquah, WA (US); Yonatan Piasetsky, Tel Aviv (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 17/198,298

(22) Filed: Mar. 11, 2021

(65) Prior Publication Data
US 2022/0294717 A1 Sep. 15, 2022

(51) Int. Cl.
*H04L 43/0864* (2022.01)
*H04W 24/08* (2009.01)
*H04L 43/106* (2022.01)

(52) U.S. Cl.
CPC ........ *H04L 43/0864* (2013.01); *H04L 43/106* (2013.01); *H04W 24/08* (2013.01)

(58) Field of Classification Search
CPC ... H04L 43/0864; H04L 43/106; H04W 24/08
See application file for complete search history.

(56) References Cited

U.S. PATENT DOCUMENTS

| | | | |
|---|---|---|---|
| 9,954,751 B2 | 4/2018 | Zhang et al. | |
| 2006/0077902 A1* | 4/2006 | Kannan | H04L 47/283 370/252 |
| 2007/0147258 A1* | 6/2007 | Mottishaw | H04L 43/12 370/392 |
| 2007/0258382 A1* | 11/2007 | Foll | H04L 41/12 370/252 |
| 2009/0168655 A1* | 7/2009 | Yamazaki | H04L 43/50 370/241.1 |

(Continued)

OTHER PUBLICATIONS

Luckie et al., "Towards Improving Packet Probing Techniques", Proceedings of the 1st ACM SIGCOMM Workshop on Internet measurement, San Francisco, USA, pp. 145-150, Nov. 1-2, 2001.

*Primary Examiner* — Hassan Kizou
*Assistant Examiner* — Hector Reyes
(74) *Attorney, Agent, or Firm* — Kligler & Associates Patent Attorneys Ltd (57) ABSTRACT

In one embodiment, a system includes a first data communication device including packet processing circuitry to provide a probe packet including an egress timestamp TS1 indicating a time at which the probe packet egresses the first data communication device, and a network interface to send the probe packet via at least one network connection to a second data communication device, and receive from the second data communication device a response packet including the egress timestamp TS1, wherein the packet processing circuitry is configured to associate with the response packet an ingress timestamp TS2 indicating a time at which the response packet ingresses the first data communication device, and a network metric processor to compute a data latency in the at least one network connection responsively to TS1, TS2, and an indication of an internal latency of the probe packet in the second data communication device.

4 Claims, 3 Drawing Sheets

(56) References Cited

U.S. PATENT DOCUMENTS

| | | | | |
|---|---|---|---|---|
| 2012/0106339 A1* | 5/2012 | Mishra | ............... | H04L 43/106 |
| | | | | 370/235 |
| 2013/0028265 A1* | 1/2013 | Ronchetti | ............. | H04J 3/0697 |
| | | | | 370/400 |
| 2016/0352601 A1* | 12/2016 | Zhang | ............... | H04L 43/0829 |
| 2017/0093670 A1* | 3/2017 | Dinan | ................... | H04L 67/22 |
| 2018/0324076 A1* | 11/2018 | Tidwell | ............. | H04L 43/0852 |

* cited by examiner

CABLE LATENCY MEASUREMENT

FIELD OF THE INVENTION

The present invention relates to computer systems, and in particular, but not exclusively to, latency in computer networks.

BACKGROUND

Latency is an important metric for troubleshooting network congestion in computer networks such as in a data center. Cables, which can range between 1 meter to 1000 meters, or so, often contribute to latency when they connect core devices and super spine via long cables. Often the longest of cables, which can range from 100 meters to 1000 meters, or so, are also physically difficult to access and measure. Also, some cables may have patch panels in between which add to the latency.

Current methods include physically isolating and measuring the actual length of the interconnect cable, or by using a physical signal meter. For large data center deployments with high rack densities and multi-hop connections, this may be difficult, or impossible, to perform in practice, especially on a live network. Therefore, operators may resort to cable length and latency estimation.

In-band telemetry (INT) partially addresses the problem of latency measurements, but does not measure at the granularity of cables. Instead, INT measures timestamps from network hop to hop. Furthermore, calibration against a central clock using protocols like PIP is required to ensure timestamps are synchronized between each network hop. Such time synchronized protocols add network complexity and require hardware support. Not all operators are willing to add this requirement to their deployed networks.

SUMMARY

There is provided in accordance with an embodiment of the present disclosure, a system including a first data communication device including packet processing circuitry configured to provide a probe packet including an egress timestamp TS1 indicating a time at which the probe packet egresses the first data communication device, and a network interface configured to send the probe packet via at least one network connection to a second data communication device, and receive from the second data communication device a response packet including the egress timestamp TS1, wherein the packet processing circuitry is configured to associate with the response packet an ingress timestamp TS2 indicating a time at which the response packet ingresses the first data communication device, and a network metric processor configured to compute a data latency in the at least one network connection between the first data communication device and the second data communication device responsively to the egress timestamp TS1 of the response packet, the ingress timestamp TS2, and an indication of an internal latency of the probe packet in the second data communication device.

Further in accordance with an embodiment of the present disclosure the network metric processor is configured to compute the data latency in the at least one network connection responsively to TS2 less TS1 less the indication of the internal latency of the probe packet in the second data communication device.

Still further in accordance with an embodiment of the present disclosure the internal latency of data packets in the second data communication device is static.

Additionally, in accordance with an embodiment of the present disclosure the packet processing circuitry of the first data communication device is configured to egress mirror a data packet destined for the second data communication device yielding the probe packet including the egress timestamp TS1.

Moreover, in accordance with an embodiment of the present disclosure, the system includes the second data communication device, which includes packet processing circuitry configured to encapsulate the probe packet with an encapsulation header yielding the response packet, the encapsulation header including a source identification of the second data communication device and a destination identification of the first data communication device.

Further in accordance with an embodiment of the present disclosure the packet processing circuitry of the first data communication device is configured to ingress mirror the response packet with the ingress timestamp TS2 yielding an ingress mirrored packet, and provide the ingress mirrored packet to the network metric processor, and the network metric processor is configured to compute the data latency in the at least one network connection between the first data communication device and the second data communication device responsively to the ingress mirrored packet and the indication of the internal latency of the probe packet in the second data communication device.

Still further in accordance with an embodiment of the present disclosure the internal latency of data packets in the second data communication device is dynamic, the system further including the second data communication device, which includes packet processing circuitry configured to compute the internal latency of the probe packet in the second data communication device, and record the internal latency in the response packet.

Additionally, in accordance with an embodiment of the present disclosure the first data communication device and the second data communication device are not clock synchronized.

Moreover, in accordance with an embodiment of the present disclosure the packet processing circuitry of the second data communication device is configured to egress mirror a return packet, which is based on the probe packet, yielding the response packet.

Further in accordance with an embodiment of the present disclosure the packet processing circuitry of the second data communication device is configured to encapsulate the probe packet with an encapsulation header yielding the return packet, the encapsulation header including a source identification of the second data communication device and the destination identification of the first data communication device.

Still further in accordance with an embodiment of the present disclosure the packet processing circuitry of the first data communication device is configured to ingress mirror the response packet with the ingress timestamp TS2 yielding an ingress mirrored packet, and provide the ingress mirrored packet to the network metric processor, and the network metric processor is configured to compute the data latency in the at least one network connection between the first data communication device and the second data communication device responsively to the ingress mirrored packet.

There is also provided in accordance with another embodiment of the present disclosure, a method including providing a probe packet including an egress timestamp TS1 indicating a time at which the probe packet egresses a first data communication device, sending the probe packet via at least one network connection to a second data communication device, receiving from the second data communication device a response packet including the egress timestamp TS1, associating with the response packet an ingress timestamp TS2 indicating a time at which the response packet ingresses the first data communication device, and computing a data latency in the at least one network connection between the first data communication device and the second data communication device responsively to the egress timestamp TS1 of the response packet, the ingress timestamp TS2, and an indication of an internal latency of the probe packet in the second data communication device.

Additionally, in accordance with an embodiment of the present disclosure the computing includes computing the data latency in the at least one network connection responsively to TS2 less TS1 less the indication of the internal latency of the probe packet in the second data communication device.

Moreover, in accordance with an embodiment of the present disclosure the internal latency of data packets in the second data communication device is static.

Further in accordance with an embodiment of the present disclosure, the method includes egress mirroring a data packet destined for the second data communication device yielding the probe packet including the egress timestamp TS1.

Still further in accordance with an embodiment of the present disclosure, the method includes encapsulating the probe packet with an encapsulation header yielding the response packet, the encapsulation header including a source identification of the second data communication device and a destination identification of the first data communication device.

Additionally in accordance with an embodiment of the present disclosure, the method includes ingress mirroring the response packet with the ingress timestamp TS2 yielding an ingress mirrored packet, wherein the computing includes computing the data latency in the at least one network connection between the first data communication device and the second data communication device responsively to the ingress mirrored packet and the indication of the internal latency of the probe packet in the second data communication device.

Moreover, in accordance with an embodiment of the present disclosure the internal latency of data packets in the second data communication device is dynamic, the method further including computing the internal latency of the probe packet in the second data communication device, and recording the internal latency in the response packet.

Further in accordance with an embodiment of the present disclosure the first data communication device and the second data communication device are not clock synchronized.

Still further in accordance with an embodiment of the present disclosure, the method includes egress mirroring a return packet, which is based on the probe packet, yielding the response packet.

Additionally, in accordance with an embodiment of the present disclosure, the method includes encapsulating the probe packet with an encapsulation header yielding the return packet, the encapsulation header including a source identification of the second data communication device and the destination identification of the first data communication device.

Moreover, in accordance with an embodiment of the present disclosure, the method includes ingress mirroring the response packet with the ingress timestamp TS2 yielding an ingress mirrored packet, wherein the computing the data latency includes computing the data latency in the at least one network connection between the first data communication device and the second data communication device responsively to the ingress mirrored packet.

There is also provided in accordance with still another embodiment of the present disclosure, a method including providing a probe packet including a timestamp TS1 indicating when the probe packet egresses a first device, sending the probe packet via at least one network connection to a second device, receiving from the second device a response packet including the timestamp TS1, associating with the response packet a timestamp TS2 indicating when the response packet ingresses the first device, and computing a data latency in the at least one network connection based on the timestamp TS1, the timestamp TS2, and an indication of an internal latency of the probe packet in the second data communication device.

BRIEF DESCRIPTION OF THE DRAWINGS

The present invention will be understood from the following detailed description, taken in conjunction with the drawings in which.

DESCRIPTION OF EXAMPLE EMBODIMENTS

Overview

Latency measurements at the cable level may provide operators with more accurate information for troubleshooting network congestion including adjusting buffer sizes in lossless transmission calculations. Fine grained latency measurements that include cable latency may improve network debuggability and visibility.

As previously mentioned, current methods either measure the entire hop to hop latency (which includes cables), or require clock synchronization mechanisms (e.g., PTP or NTP). Not all operators are willing to add this clock synchronization requirement to their deployed networks in order to trouble shoot congestion issues, or to gain insight about cable latencies for lossless headroom calculations.

Embodiments of the present invention solve the above problems by accurately measuring cable latency between data communication devices (e.g., switches, routers, and end host network interface cards) without the need for clock synchronization between the data communication devices.

In some embodiments, a first data communication device sends a probe packet including an egress timestamp TS1, which indicates when the probe packet egresses the first data communication device, via a cable to a second data communication device. The probe packet is received by the second data communication device, which in response to receiving the probe packet, sends a response packet to the first data communication device. General probe packets are discussed in "Towards improving Packet Probing Techniques" authored by Matthew J. Luckie, Anthony J. McGregor, Hans-Werner Braun, currently linked at www.caida.org/~mjl/pubs/ipmp.pdf, and in U.S. Pat. No. 9,954,751.

The first communication device receives the response packet and associates with the response packet an ingress timestamp TS2, which indicates when the response packet ingresses the first communication device.

The data latency in the cable may then be computed based on TS1, TS2 and an indication of the internal latency (IL) of the probe packet in the second data communication device.

For example, the data latency in the cable may be computed based on:

$$\tfrac{1}{2} \times [TS2 - TS1 - IL] \qquad \text{(Equation 1)}.$$

As the timestamps TS1 and TS2 are based on the internal clock of the first data communication device, there is no need to synchronize clocks between the first and second data communication devices.

In some embodiments, the internal latency of the probe packet in the second data communication device may be estimated, for example, when the internal latency in the second data communication device is static and known.

In some embodiments, the internal latency of the probe packet in the second data communication device may be computed, for example, when the internal latency in the second data communication device is dynamic. The internal latency may be computed based on the difference between an ingress timestamp of the probe packet in the second data communication device and an egress timestamp of the response packet leaving the second data communication device. The computed internal latency may then be recorded in the response packet, which is sent to the first data communication device. As the internal latency is computed based on a time difference of the internal clock of the second data communication device, there is no need to synchronize clocks between the first and second data communication devices to compute the internal latency.

Packet encapsulation and/or mirroring may be performed in one or more of the data communication devices for the probe packet and/or response packet as described with reference to disclosed embodiments.

System Description

Figure 1:
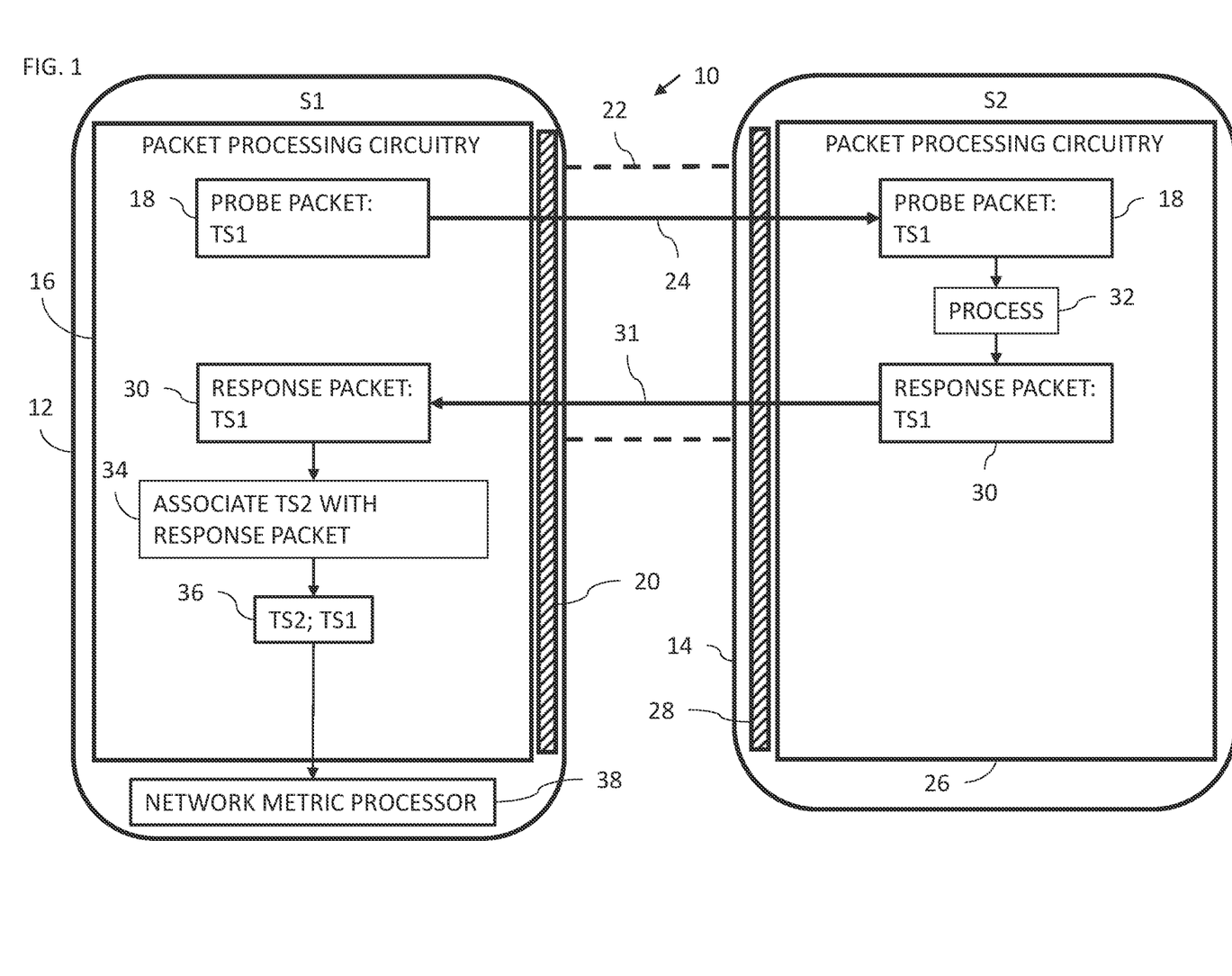
FIG. 1 is a block diagram view of a cable latency measurement system constructed and operative in accordance with an embodiment of the present invention.

Reference is now made to FIG. 1, which is a block diagram view of a cable latency measurement system 10 constructed and operative in accordance with an embodiment of the present invention. The cable latency measurement system 10 includes a data communication device 12 (also labeled S1) and a data communication device 14 (also labeled S2). The data communication device 12 and the data communication device 14 do not need to be clocked synchronized. In some embodiments, the data communication device 12 and the data communication device 14 are not clock synchronized.

The data communication device 12 includes packet processing circuitry 16, which is configured to provide a probe packet 18 including an egress timestamp TS1 indicating a time at which (i.e., when) the probe packet 18 egresses the data communication device 12. The data communication device 12 also includes a network interface 20 configured to send the probe packet 18 (arrow 24) via at least one network connection 22 (e.g., a cable or cables) to the data communication device 14.

The data communication device 14 includes packet processing circuitry 26 and a network interface 28. The packet processing circuitry 26 is configured to receive the probe packet 18 over the network interface 28 and process (block 32) the probe packet 18 yielding a response packet 30, which also includes the timestamp TS1. The packet processing circuitry 26 is configured to send (arrow 31) the response packet 30 over the network interface 28 and via the network connection(s) 22 to the data communication device 12.

The packet processing circuitry 16 of the data communication device 12 is configured to receive the response packet 30 (including the timestamp TS1) from the data communication device 14 over the network interface 20. The packet processing circuitry 16 is configured to associate (block 34) with the response packet 30 an ingress timestamp TS2 (block 36) indicating a time at which the response packet 30 ingresses the data communication device 12.

The cable latency measurement system 10 may also include a network metric processor 38. The network metric processor 38 may be a comprised in the data communication device 12, the data communication device 14, and/or another network node. For example, the network metric processor 38 may be comprised in a central processing unit (CPU) of the data communication device 12.

The timestamps TS1 and TS2 are passed to the network metric processor 38 (for example, in the response packet 30 or in a packet based on the response packet 30). The network metric processor 38 is configured to compute a data latency in the network connection(s) 22 between the data communication device 12 and the data communication device 14 responsively to: the egress timestamp TS1 of the response packet 30; the ingress timestamp TS2; and an indication of an internal latency of the probe packet 18 in the data communication device 14. The internal latency is defined as the estimated or computed time between the probe packet 18 arriving in the data communication device 14 and the response packet 30 (which is based on the probe packet 18) leaving the data communication device 14 to the data communication device 12.

In some embodiments, the network metric processor 38 is configured to compute the data latency in the network connection(s) 22 responsively to TS2 less TS1 less the indication of the internal latency (IL) of the probe packet 18 in the data communication device 14. For example, the data latency in the network connection(s) 22 may be computed based on:

$$\tfrac{1}{2} \times [TS2 - TS1 - IL] \qquad \text{(Equation 1)}.$$

As the timestamps TS1 and TS2 are based on the internal clock of the data communication device 12, there is no need to synchronize clocks between the data communication device 12 and the data communication device 14.

In practice, some or all of the functions of the packet processing circuitry 16 or packet processing circuitry 26 may be combined in a single physical component or, alternatively, implemented using multiple physical components. These physical components may comprise hard-wired or programmable devices, or a combination of the two. In some embodiments, at least some of the functions of the processing circuitry 16, 26 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Figure 2:
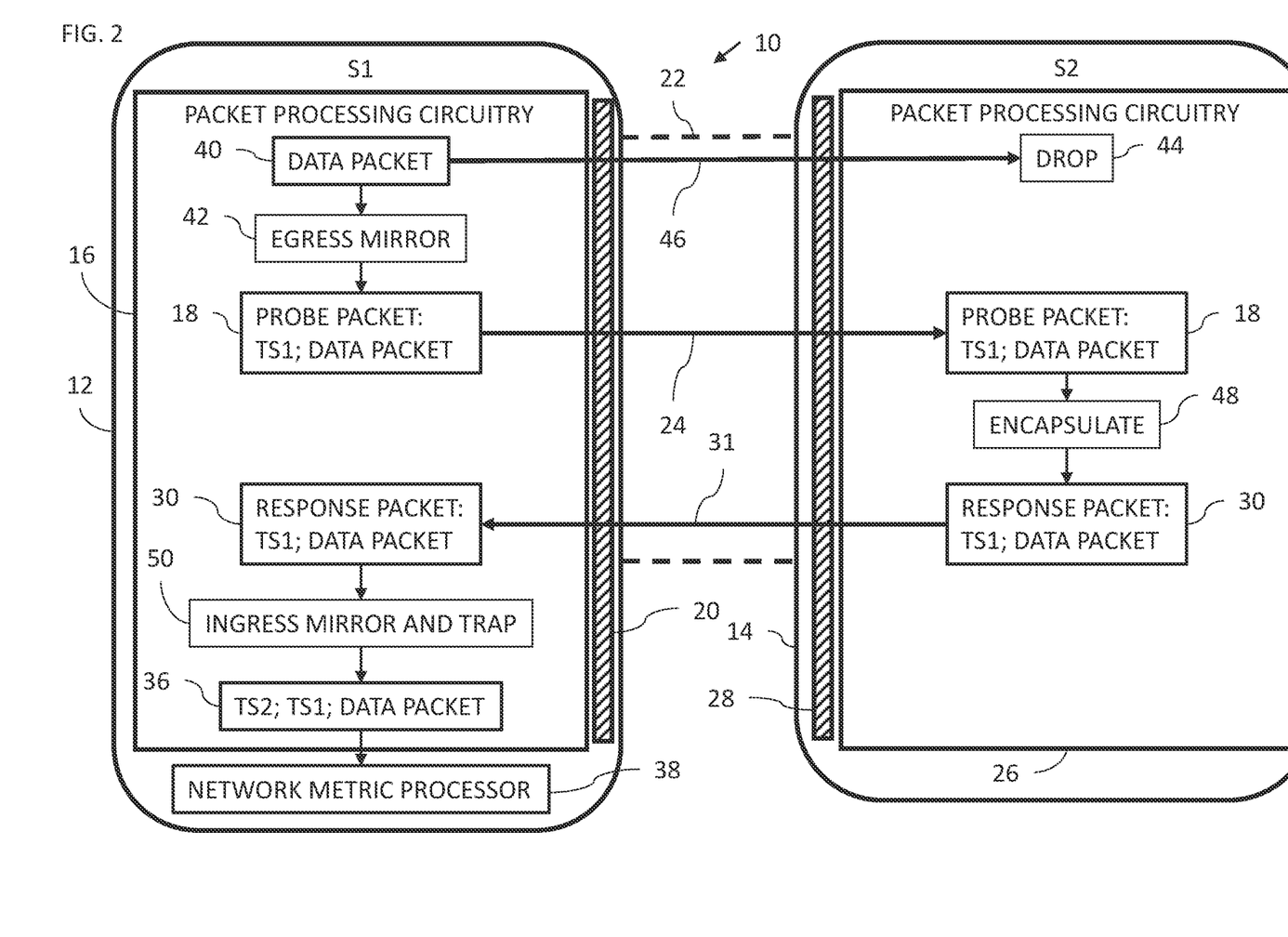
FIG. 2 is a block diagram view of the system of FIG. 1 operational in accordance with a first method of operation.

Reference is now made to FIG. 2, which is a block diagram view of the system 10 of FIG. 1 operational in accordance with a first method of operation.

The first method of operation described with reference to FIG. 2 assumes that the internal latency of data packets in the data communication device 14 is static.

The data communication device 12 is configured to generate a data packet 40. In some embodiments, a CPU (not shown) of the data communication device 12 is configured to generate the data packet 40. The data packet 40 is processed to be sent to the data communication device 14 and includes a suitably addressed header.

The packet processing circuitry 16 of the data communication device 12 is configured to egress mirror (block 42) the data packet 40 destined for the data communication device 14 yielding the probe packet 18 including the egress timestamp TS1. The network interface 20 is configured to: send the data packet 40 (arrow 46) and the probe packet 18 (arrow 24) via the network connection(s) 22 to the data communication device 14. On receipt of the data packet 40 in the data communication device 14, the data packet 40 is dropped (block 44).

The packet processing circuitry 26 is configured to receive the probe packet 18 and encapsulate (block 48) the probe packet 18 with an encapsulation header yielding the response packet 30. The encapsulation header may include a source identification of the data communication device 14 and a destination identification of the data communication device 12. Encapsulation may be performed using any suitable protocol, for example, Generic Routing Encapsulation (GRE) or Virtual Extensible LAN (VXLAN). The packet processing circuitry 26 is configured to send (arrow 31) the response packet 30 over the network interface 28 via the network connection(s) 22 to the data communication device 12. The packet processing circuitry 26 may use policy-based switching to send response packet 30 to data communication device 12 on the same port that the probe packet 18 was received on.

The packet processing circuitry 16 of the data communication device 12 is configured to receive the response packet 30, and ingress mirror (block 50) the response packet 30 with the ingress timestamp TS2 yielding an ingress mirrored packet (block 36); and provide (e.g., trap) the ingress mirrored packet (block 36) to the network metric processor 38.

The network metric processor 38 is configured to compute the data latency in the network connection(s) 22 between the data communication device 12 and the data communication device 14 responsively to the ingress mirrored packet (block 36) (e.g., based on TS1 and TS2) and an indication of the internal latency of the probe packet 18 in the data communication device 14.

In some embodiments, the network metric processor 38 is configured to compute the data latency in the network connection(s) 22 responsively to TS2 less TS1 less the indication of the internal latency (IL) of the probe packet 18 in the data communication device 14. For example, the data latency in the network connection(s) 22 may be computed based on:

$$\tfrac{1}{2} \times [TS2 - TS1 - IL] \quad \text{(Equation 1)}.$$

As the timestamps TS1 and TS2 are based on the internal clock of the data communication device 12, there is no need to synchronize clocks between the data communication device 12 and the data communication device 14.

Figure 3:
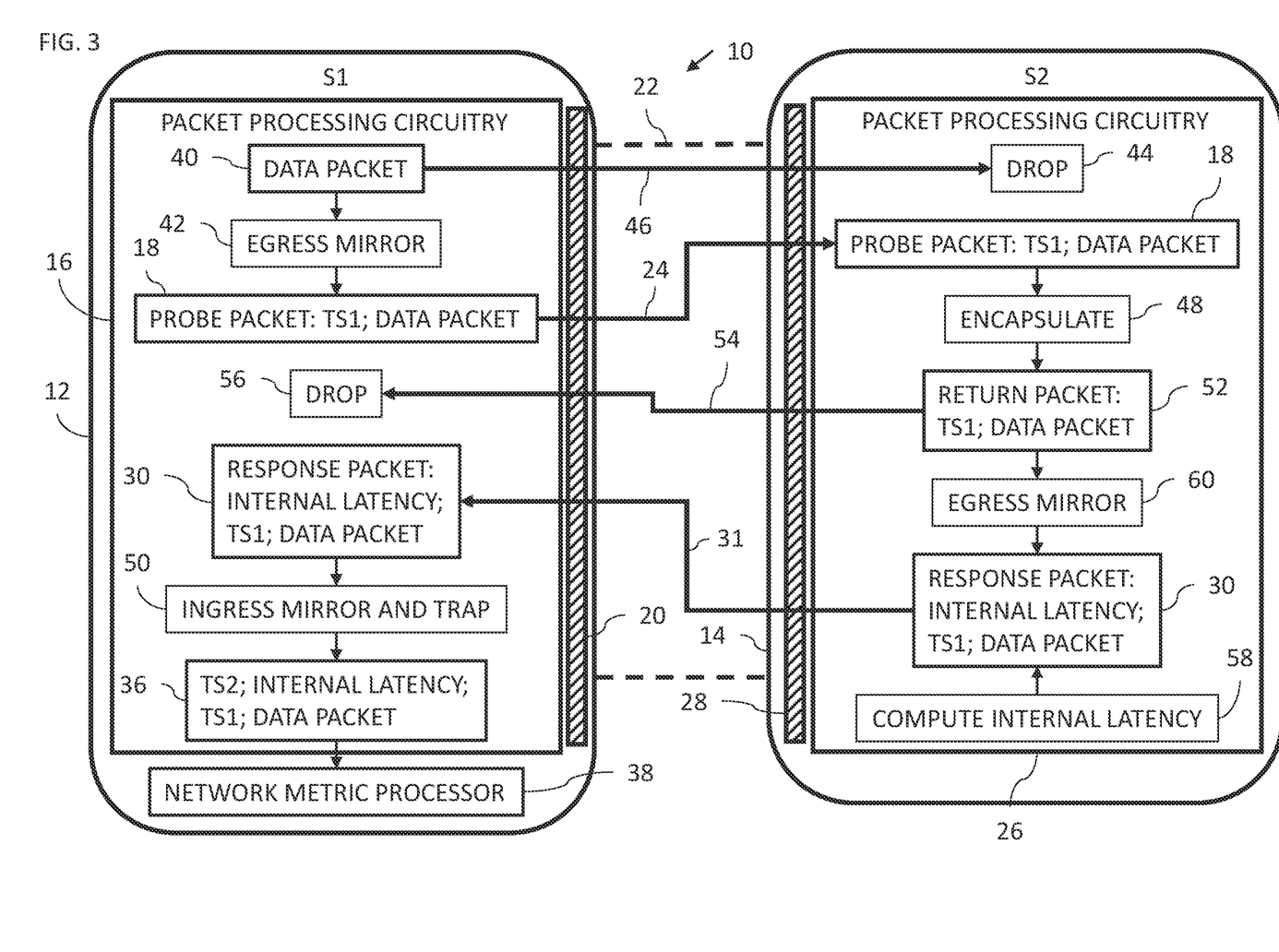
FIG. 3 is a block diagram view of the system of FIG. 1 operational in accordance with a second method of operation.

Reference is now made to FIG. 3, which is a block diagram view of the system 10 of FIG. 1 operational in accordance with a second method of operation.

The second method of operation described with reference to FIG. 3 assumes that the internal latency of data packets in the data communication device 14 is dynamic.

The data communication device 12 is configured to generate the data packet 40. In some embodiments, the CPU (not shown) of the data communication device 12 is configured to generate the data packet 40. The data packet 40 is processed to be sent to the data communication device 14 and includes a suitably addressed header.

The packet processing circuitry 16 of the data communication device 12 is configured to egress mirror (block 42) the data packet 40 destined for the data communication device 14 yielding the probe packet 18 including the egress timestamp TS1. The network interface 20 is configured to: send the data packet 10 (arrow 46) and the probe packet 18 (arrow 24) via the network connection(s) 22 to the data communication device 14. On receipt of the data packet 40 in the data communication device 14, the data packet 40 is dropped (block 44).

The packet processing circuitry 26 of the data communication device 14 is configured to receive the probe packet 18 and encapsulate (block 48) the probe packet 18 with an encapsulation header yielding a return packet 52. The encapsulation header may include a source identification of the data communication device 14 and a destination identification of the data communication device 12. Encapsulation may be performed using any suitable protocol for example, Generic Routing Encapsulation (GRE) or Virtual Extensible LAN (VXLAN).

The packet processing circuitry 26 of the data communication device 14 is configured to compute (block 58) an internal latency of the probe packet 18 in the data communication device 14. The internal latency is defined as the time between the probe packet 18 arriving in the data communication device 14 and the return packet 52 (or the response packet 30) (which are based on the probe packet 18) leaving the data communication device 14 to the data communication device 12, described in more detail below. In some embodiments, the internal latency may be computed based on the difference between the time of ingress of the probe packet 18 in the data communication device 14 and the time of egress of the return packet 52 or the response packet 30 from the data communication device 14 to the data communication device 12. As the internal latency is computed based on a time difference of an internal clock of the data communication device 14, there is no need to synchronize clocks between the data communication devices 12, 14 to compute the internal latency.

The packet processing circuitry 26 of the data communication device 14 is configured to: egress mirror (block 60) the return packet 52, which is based on the probe packet 18, yielding the response packet 30 and record the computed internal latency in the response packet 30.

The packet processing circuitry 26 is configured to send (arrow 54) the return packet 52 to the data communication device 12. On receipt of the return packet 52 in the data communication device 12, the return packet 52 is dropped (block 56). The packet processing circuitry 26 may use policy-based switching to send return packet 52 to data communication device 12 on the same port that the probe packet 18 was received on.

The packet processing circuitry 26 is configured to send (arrow 31) the response packet 30 over the network interface 28 via the network connection(s) 22 to the data communication device 12. The packet processing circuitry 26 may use policy-based switching to send response packet 30 to data communication device 12 on the same port that the probe packet 18 was received on.

The packet processing circuitry 16 of the data communication device 12 is configured to receive the response packet 30, and ingress mirror (block 50) the response packet 30 with the ingress timestamp TS2 yielding an ingress mirrored packet (block 36); and provide (e.g., trap) the ingress mirrored packet (block 36) to the network metric processor 38.

The network metric processor 38 is configured to compute a data latency in the network connection(s) 22 between the data communication device 12 and the data communication device 14 responsively to the ingress mirrored packet (block 36) (e.g., based on TS1 and TS2 and the computed indication of the internal latency of the probe packet 18 in the data communication device 14 included in the ingress mirrored packet).

In some embodiments, the network metric processor 38 is configured to compute the data latency in the network connection(s) 22 responsively to TS2 less TS1 less the computed indication of the internal latency (IL) of the probe packet 18 in the data communication device 14. For example, the data latency in the network connection(s) 22 may be computed based on:

$$\tfrac{1}{2} \times [TS2 - TS1 - IL] \qquad \text{(Equation 1).}$$

As the timestamps TS1 and TS2 are based on the internal clock of the data communication device 12, there is no need to synchronize clocks between the data communication device 12 and the data communication device 14.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. A system comprising:
a first data communication device to generate a data packet, and including:
packet processing circuitry to egress mirror the data packet yielding a probe packet including an egress timestamp TS1; and
a network interface to send the data packet and the probe packet via at least one network connection to a second data communication device, the at least one network connection being at least one cable; and
the second data communication device, an internal latency of data packets in the second data communication device being dynamic, the second data communication device including packet processing circuitry to: receive the probe packet; encapsulate the probe packet with an encapsulation header yielding a return packet, the encapsulation header including a source identification of the second data communication device and a destination identification of the first data communication device; compute the internal latency of the probe packet in the second data communication device based on the difference between a time of ingress of the probe packet in the second data communication device and a time of egress of the return packet from the second data communication device to the first communication device computed based on a time difference of an internal clock of the second data communication device; egress mirror the return packet yielding a response packet; record the computed internal latency in the response packet; and send the response packet to the first data communication device, and wherein:
the network interface of the first data communication device is configured to receive from the second data communication device the response packet including: the egress timestamp TS1; and the computed internal latency of the probe packet in the second data communication device;
the packet processing circuitry of the first data communication device is configured to receive the response packet; ingress mirror the response packet with an ingress timestamp TS2 yielding an ingress mirrored packet; and provide the ingress mirrored packet to a network metric processor, the ingress timestamp TS2 indicating a time at which the response packet ingresses the first data communication device; and
the first data communication device includes the network metric processor to compute a data latency in the at least one network connection between the first data communication device and the second data communication device responsively to the ingress mirrored packet based on TS2 less TS1 less the computed internal latency of the probe packet in the second data communication device.

2. The system according to claim 1, wherein the first data communication device and the second data communication device are not clock synchronized.

3. A method comprising:
generating a data packet in a first data communication device;
egress mirroring the data packet yielding a probe packet including an egress timestamp TS1;
sending the data packet and the probe packet via at least one network connection to a second data communication device, the at least one network connection being at least one cable, wherein an internal latency of data packets in the second data communication device is dynamic;
receiving the probe packets by the second data communication device;
encapsulating the probe packet with an encapsulation header yielding a return packet, the encapsulation header including a source identification of the second data communication device and a destination identification of the first data communication device;
computing by the second data communication device the internal latency of the probe packet in the second data communication device based on the difference between a time of ingress of the probe packet in the second data communication device and a time of egress of the return packet from the second data communication device to the first communication device computed based on a time difference of an internal clock of the second data communication device;
egress mirroring the return packet yielding a response packet;

recording by the second data communication device the computed internal latency in the response packet;

sending the response packet to the first data communication device;

receiving from the second data communication device the response packet;

ingress mirroring the response packet with an ingress timestamp TS2 yielding an ingress mirrored packet, the ingress timestamp TS2 indicating a time at which the response packet ingresses the first data communication device; and computing a data latency in the at least one network connection between the first data communication device and the second data communication device responsively to the ingress mirrored packet based on TS2 less TS1 less the computed internal latency of the probe packet in the second data communication device.

4. The method according to claim 3, wherein the first data communication device and the second data communication device are not clock synchronized.

* * * * *